G. KINTZI.
Whiffletree.

No. 2,601. Patented May 4, 1842.

UNITED STATES PATENT OFFICE.

GEO. KINTZI, OF EXETER TOWNSHIP, BERKS COUNTY, PENNSYLVANIA.

METHOD OF RELEASING HORSES FROM CARRIAGES.

Specification of Letters Patent No. 2,601, dated May 4, 1842.

*To all whom it may concern:*

Be it known that I, GEORGE KINTZI, of Exeter township, in the county of Berks and State of Pennsylvania, have invented a new and Improved Mode of Disconnecting Horses from Carriages and Preventing Their Oversetting; and I do hereby declare that the following is a full, clear, and exact description thereof, reference being had to the annexed drawings, making a part of this specification, of which—

Figure 1:
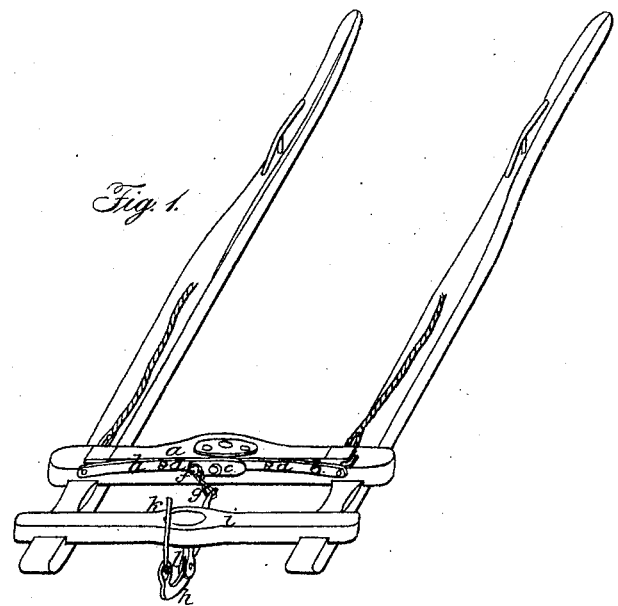
Figure 2:
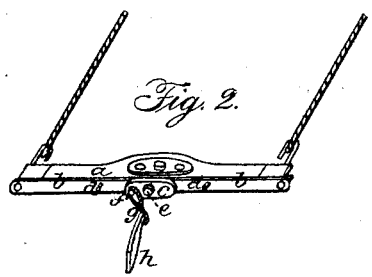
Figure 3:
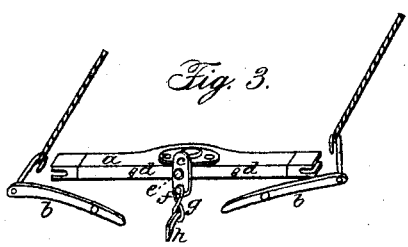
Figure 4:
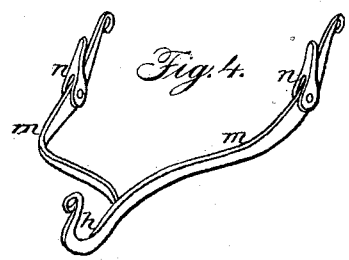

Figure 1 is a perspective view, and Figs. 2, 3 and 4 the most important sections and details.

The nature of my invention consists in providing the back flat part of a swingle tree (a) with springs (b) whose thinner ends come to lie in about the center of said tree, under a turning plate (c) permitting the springs to escape from on the swingle tree.

To enable others skilled in the art to make and use my invention I will proceed to describe its construction and operation.

I construct my swingle tree in any of the known forms. However, toward its ends I make it a little thinner, and the ironed part thereof on both sides of each end somewhat protuberant, so as to prevent the springs from escaping. Then I use two metallic angular springs, each of them growing thinner from the angle to its end, which reaches nearly the center of the swingle tree, whereon it comes longitudinally to lie, and is kept by an unheaded nail (d). The other part of each spring is thicker in size than the former from its angle to the end, which forms a strong hook whereto the horse's spring is put. This part of the spring is somewhat bowed, and moves between the protruded edges of the swingle tree, as represented in Figs. 1 and 2. As afore stated, the thinner end of the longer part of each spring, reaching about the center of the swingle tree, must thereon be kept by a turning plate. This turning plate I make of an oblong form, of iron or any other metallic compound. Through its center and that of the swingle tree passes a strong pin (e) with a large round head lying flat on the plate. The pin's end must be screwed to the swingle tree on its opposite side, Fig. No. 3, on the same turning plate close to the said large pin's head, and longitudinally with the swingle tree or oblong part of the plate must be fastened to the opposite side of the latter another smaller round head (f) whereto I tie a short, but strong, leather strap (g), the other end of which will be attached to the hook of the pulling tong (h) passing from near the center of the swingle tree through beneath the so-called cross or transverse wooden piece (i) of the vehicle's shaft to near the rider's seat, which he reaches by means of another leather strap (k) at the tong's other end. The pulling tong is pretty strong, being made of iron. It has a hook at each of its two ends whereto the said straps are to be fastened. Beneath the said cross piece it moves up and down, in a kind of saddle (l). The hook in the vicinity of the turning plate looks downward. The other hook on the contrary looks upward. A similar process and mode would be necessary for a 2 horse carriage, with the only difference, however, that in this case the pulling tong should be divided into two arms (m) of the required length. Their moving might be secured by two supplementary saddles (n) in the most convenient part of the vehicle, Fig. 4.

The object and utility of my invention is this: In case of danger arising from the horse becoming wild and unmanageable the rider or conductor pulls the tong upward. The turning plate immediately moves around downward and standing vertical it loosens the springs on both sides of the swingle tree, which drop on the ground, and permit the horse to escape.

What I claim as my invention and desire to secure by Letters Patent is—

The mode herein described of releasing horses from a carriage by means of the springs, which are connected with the swingle tree, by the turning plate, as herein described.

GEORGE KINTZI.

Witnesses:
SAMUEL EDELMAN,
G. XAV. WAGNER.